(12) United States Patent
Ozawa et al.

(10) Patent No.: US 7,345,111 B2
(45) Date of Patent: Mar. 18, 2008

(54) ACRYLIC POLYMER EMULSION AND GLOVE FORMED FROM THE SAME

(75) Inventors: Yutaka Ozawa, Hyogo (JP); Nobuaki Takahashi, Hyogo (JP)

(73) Assignee: Showa Glove Co., Himeji-Shi (JP)

( * ) Notice: Subject to any disclaimer, the term of this patent is extended or adjusted under 35 U.S.C. 154(b) by 0 days.

(21) Appl. No.: 10/560,619

(22) PCT Filed: Sep. 2, 2005

(86) PCT No.: PCT/JP2005/016096

§ 371 (c)(1),
(2), (4) Date: Dec. 14, 2005

(87) PCT Pub. No.: WO2006/028008

PCT Pub. Date: Mar. 16, 2006

(65) Prior Publication Data

US 2007/0100063 A1    May 3, 2007

(30) Foreign Application Priority Data

Jun. 9, 2004    (JP)    ............... 2004-257801

(51) Int. Cl.
*C08F 236/04*    (2006.01)
*C08F 2/16*    (2006.01)
*C08F 218/08*    (2006.01)
*C08F 214/06*    (2006.01)
*C08F 220/18*    (2006.01)
*C08G 18/62*    (2006.01)

(52) U.S. Cl. .................. 524/822; 524/800; 524/819; 524/823; 524/832; 524/833

(58) Field of Classification Search ............. None
See application file for complete search history.

(56) References Cited

U.S. PATENT DOCUMENTS 6,066,394 A * 5/2000 Hoff et al. ............ 428/355 AC
6,174,943 B1 * 1/2001 Matsumoto et al. ........ 524/115
6,242,560 B1 * 6/2001 Gyobu et al. ............... 528/272

FOREIGN PATENT DOCUMENTS

| JP | 59-075969 | | 4/1984 |
|---|---|---|---|
| JP | 04-239507 | | 8/1992 |
| JP | 05-005014 | | 1/1993 |
| JP | 06079737 A | * | 3/1994 |
| JP | 10-046099 | | 2/1998 |
| JP | 10046099 A | * | 2/1998 |
| JP | 2001-040313 | | 2/2001 |
| JP | 2002-088343 | | 3/2002 |
| JP | 2002088343 A | * | 3/2002 |

OTHER PUBLICATIONS

Brandrup et al, Polymer Handbook, 1999, John-Wiley and Sons, Fourth Edition, VI/216.*
International Search Report dated Nov. 1, 2005.

* cited by examiner

*Primary Examiner*—Vasu Jagannathan
*Assistant Examiner*—Karuna Reddy
(74) *Attorney, Agent, or Firm*—Kratz, Quintos & Hanson, LLP

(57)    ABSTRACT

The present invention provides an acrylic polymer emulsion containing a polymer formed by polymerizing 100% by weight in total of a monodic mixture comprising 50 to 90% by weight of an alkyl acrylate or an alkyl methacrylate, 9 to 49% by weight of a vinyl monomer of which homopolymer having a glass transition temperature Tg is not lower than 80° C., 0.2 to 10% by weight of a vinyl monomer having a carboxyl group and 0.1 to 5% by weight of a crosslinkable monomer having a molecular weight of not less than 280. The acrylic polymer emulsion of present invention provides gloves for home uses, works, examination operations, medical uses and the like which are superior in practical performances such as tensile strength, elongation, alcohol resistance, detergent resistance, oil resistance, recovering property after a stretch and wearing touch.

9 Claims, No Drawings

ACRYLIC POLYMER EMULSION AND GLOVE FORMED FROM THE SAME

TECHNICAL FIELD

The present invention relates to an acrylic polymer emulsion and a glove formed from this emulsion, and particularly to a acrylic polymer emulsion which is used as a water base molding material, a covering material, an adhesive or a processing agent for paper or fiber, and gloves for home uses, works, examination operations and medical uses, which are obtained by using this emulsion and are superior in practical performance such as tensile strength, elongation, alcohol resistance, detergent resistance, oil resistance, a recovering property after a stretch and a wearing touch.

BACKGROUND ART

Previously, as a water base molding material, a covering material, an adhesive or a processing agent for paper or fiber, there are widely used natural rubbers, synthetic rubbers such as NBR, SBR, chloroprene rubber and silicon rubber, or resin materials such as fluorine base and acryl base. However, these materials were not satisfactory in terms of the practical performance of a glove as a molded product such as tensile strength, elongation, alcohol resistance, a recovering property after a stretch and a wearing touch as a molding material for gloves, for example, for home uses, works, examination operations and medical uses.

For example, in the Patent Literature 1, a glove formed by adding zinc white and a publicly known resin crosslinking agent to an acrylic resin emulsion and molding this mixture is described, and in the Patent Literature 2, a glove formed by adding a silane coupling agent to an acrylic resin emulsion and molding this mixture is described, and in the Patent Literature 3, a glove, which is prepared by providing a rubber layer containing ceramic particles having an average particle diameter of 10 to 100 μm or organic filler particles on the outer surface of a glove obtained from acrylic resin, is described, and in the Patent Literature 4, a glove, which is obtained by blending an acrylic resin emulsion with a thixotropy imparting material such as ammonium polyacrylate and a polycarboxylic acid compound or a thickner, is disclosed.

However, acrylic resins used in these Patent Literatures 1 to 4 are a polymer of n-butyl acrylate or ethyl acrylate, or a substance formed by crosslinking these acrylates using an external crosslinking agent and is not provided with adequate strength, modulus, elongation and adequate alcohol resistance or an adequate recovering property to be described later. The reason for this is that general emulsions of these acrylic resins have a poor balance between absolute values of strength, modulus, elongation, alcohol resistance, etc. and have a poor recovering property after a stretch. In addition, when the molded articles obtained are dried and crosslinked, they have a property like resin, namely have a paper-like property and lack in a rubber-like property, and therefore they are not practical also in terms of touch as a glove. That is, since they are insufficient in physical properties and performance and also insufficient in terms of touch as a glove, they are not in practical use under the present conditions.

Moreover, in the Patent Literature 5, a water base resin composition, obtained by performing the emulsion polymerization of a vinyl monomer in the presence of suspension polymer particles in which an acid value and a hydroxyl group value are specified, is proposed, and it is shown that this composition is superior in alcohol shock resistance and water resistance of a coat. As that suspension polymer, there is described a polymer consisting of 45 to 75 parts by weight of methyl methacrylate (MMA), 0 to 20 parts by weight of styrene (ST), 0 to 20 parts by weight of n-butyl acrylate (n-BA), 0 to 20 parts by weight of 2-ethylhexyl acrylate (2-EHA), 0 to 25 parts by weight of 2-hydroxyethyl methacrylate (2-HEMA) and 6 to 35 parts by weight of methacrylic acid (MAA) ([Table 1] and [Table 2]). Further, as an emulsion polymer, there is proposed a polymer consisting of 10 to 35 parts by weight of MMA, 10 to 20 parts by weight of ST, 0 to 40 parts by weight of n-BA, 0 to 40 parts by weight of 2-EHA, 5 parts by weight of 2-HEMA and 10 to 25 parts by weight of glycidyl methacrylate (GMA) ([Table 3]).

However, even if such a complicated method of polymerization is employed, the obtained gloves were not satisfactory in terms of strength and a recovering property after a stretch.

Patent Literature 1: Japanese Unexamined Patent Publication No. 2000-355808
Patent Literature 2: Japanese Unexamined Patent Publication No. 2001-89913
Patent Literature 3: Japanese Unexamined Patent Publication No. 2001-295113
Patent Literature 4: Japanese Unexamined Patent Publication No. 2002-194609
Patent Literature 5: Japanese Unexamined Patent Publication No. 10-265636

DISCLOSURE OF THE INVENTION

Problems to Solve the Problems

In view of the above state of the art, it is intended to improve practical performance such as tensile strength, elongation, alcohol resistance, detergent resistance, oil resistance, a recovering property after a stretch and a wearing touch in molded articles such as a glove by obtaining a new water-dispersed polymer and using this water-dispersed polymer.

Means to Solve the Problems

That is, the present invention intends to obtain a glove which improves the above-mentioned defects in acrylic resins and exerts excellent practical performance only by thermally drying and thermally crosslinking in a simple formulation without using an external crosslinking agent, and provides an acrylic molding material in emulsion form which has the excellent practical performance described above and also has flexibility and returning property like rubber as distinct from a paper-like touch by introducing a long chain crosslinkable monomer as a crosslinkable monomer of an alkyl acrylate monomer or an alkyl methacrylate monomer and a glove obtained from the same.

The present invention for achieving the above objects provides an acrylic polymer emulsion containing a polymer formed by polymerizing 100% by weight in total of a monodic mixture comprising 50 to 90% by weight of an alkyl acrylate or an alkyl methacrylate, 9 to 49% by weight of a vinyl monomer of which homopolymer having a glass transition temperature Tg is not lower than 80° C., 0.2 to 10% by weight of a vinyl monomer having a carboxyl group and 0.1 to 5% by weight of a crosslinkable monomer having a molecular weight of not less than 280.

In accordance with the present invention, there is more suitably provided an acrylic polymer emulsion containing a polymer formed by polymerizing 100% by weight in total of a monodic mixture comprising 60 to 80% by weight of an alkyl acrylate or an alkyl methacrylate, 19 to 39% by weight of a vinyl monomer of which homopolymer having a glass transition temperature Tg is not lower than 80° C., 0.5 to 5% by weight of a vinyl monomer having a carboxyl group and 0.3 to 3% by weight of a crosslinkable monomer having a molecular weight of not less than 280.

In accordance with the present invention, there is still more suitably provided an acrylic polymer emulsion containing a polymer formed by polymerizing 100% by weight in total of a monodic mixture comprising 70 to 75% by weight of an alkyl acrylate or an alkyl methacrylate, 23 to 28% by weight of a vinyl monomer of which homopolymer having a glass transition temperature Tg is not lower than 80° C., 1 to 3% by weight of a vinyl monomer having a carboxyl group and 0.5 to 2.5% by weight of a crosslinkable monomer having a molecular weight of not less than 280.

In accordance with the present invention, the acrylic polymer emulsion according to any one of claims 1 to 3, in which the alkyl acrylate or the alkyl methacrylate is preferably an alkyl acrylate or an alkyl methacrylate containing an alkyl group having carbon atoms of not less than 8, particularly for applications requiring the alcohol resistance.

In accordance with the present invention, the acrylic polymer emulsion according to claim 4, in which the alkyl acrylate or the alkyl methacrylate containing an alkyl group having carbon atoms of not less than 8 is preferably at least one kind selected from 2-ethylhexyl acrylate, 2-ethylhexyl methacrylate, lauryl acrylate and lauryl methacrylate.

In accordance with the present invention, the acrylic polymer emulsion according to any one of claims 1 to 5, in which the vinyl monomer of which homopolymer having a glass transition temperature Tg is not lower than 80° C. is preferably at least one kind selected from acrylonitrile, styrene and methyl methacrylate.

In accordance with the present invention, the acrylic polymer emulsion according to any one of claims 1 to 6, in which the vinyl monomer having a carboxyl group is preferrably acrylic acid.

In accordance with the present invention, the acrylic polymer emulsion according to any one of claims 1 to 7, in which the crosslinkable monomer having a molecular weight of not less than 280 is preferably poly(tetramethyleneether) glycol diglycidyl ether.

In accordance with the present invention, the acrylic polymer emulsion according to any one of claims 1 to 8, in which the crosslinkable monomer having a molecular weight of not less than 280 is preferably poly(tetramethyleneether) glycol diglycidyl ether and at least one kind selected from propylene glycol polybutylene glycol monoacrylate and 3-alkoxy-2-hydroxypropyl acrylate having an alkoxy group with carbon atoms of not less than 10.

And, the present invention provides a glove obtained by molding by a method of immersing a mold of hand using the above polymer emulsion.

EFFECTS OF THE INVENTION

As a material of a glove, polyvinyl chloride (PVC), natural rubber (NR), synthetic rubbers (NBR, etc.) and polyurethane (PU) are usually used at the present market, but the present invention provides newly an acrylic emulsion material which is not a resin material (containing a plasticizer) in addition to the above materials and a glove which is formed from this material. Since this material is in emulsion form, a glove can be easily made by salt-coagulation immersion, and further it does not need a vulcanization agent (S, ZnO, etc.) and a vulcanization accelerator, which is disliked in some applications because it causes discoloration, as in NR, and NBR and therefore there is no worry that the vulcanization accelerator causes allergy of class IV (irritation of skin). And, since it does not contain a solvent and a plasticizer, it is ecologically friendly, does not require solvent recovery and there is no possibility of bleeding (migration of a plasticizer). And, on the occasion of glove manufacturing, the gloves can be manufactured by only drying and thermally crosslinking, and a thin or extremely thin glove can be manufactured with ease.

As described above, in the conventional technology, since the acrylic resin emulsion is stable because of being hydrophilic but it has a low film-forming property in a salt-coagulation process and low alcohol resistance, the acrylic resin emulsion could not be employed in food processing and uses of implementing alcohol disinfection at all.

On the other hand, in accordance with the present invention, it is possible to improve the detergent resistance and the oil resistance by introducing a crosslinkable monomer having a relatively large molecular weight into an alkyl acrylate monomer, and further it is possible to remarkably improve the alcohol resistance by using a long chain alkyl acrylate monomer to add a hydrophobic property. And, by using the above crosslinkable monomer, an acrylic emulsion material is provided with the plasticity and the flexibility and results in improved balance of practical performances, and also has the flexibility and the recovering property after a stretch like rubber as distinct from a paper-like resin touch and can provides a practically usable acrylic glove, an acrylic emulsion material for molding this glove and a glove molded using this material.

BEST MODE FOR CARRYING OUT THE INVENTION

The acrylic polymer emulsion of the present invention is characterized by containing an acrylic polymer formed by polymerizing 100% by weight in total of a monodic mixture comprising 50 to 90% by weight of an alkyl acrylate or an alkyl methacrylate, 9 to 49% by weight of a vinyl monomer of which homopolymer having a glass transition temperature Tg is not lower than 80° C., 0.2 to 10% by weight of a vinyl monomer having a carboxyl group and 0.1 to 5% by weight of a crosslinkable monomer having a molecular weight of not less than 280.

The acrylic polymer emulsion of the present invention preferably contains an acrylic polymer formed by polymerizing 100% by weight in total of a monodic mixture comprising 60 to 80% by weight of an alkyl acrylate or an alkyl methacrylate, 19 to 39% by weight of a vinyl monomer of which homopolymer having a glass transition temperature Tg is not lower than 80° C., 0.5 to 5% by weight of a vinyl monomer having a carboxyl group and 0.3 to 3% by weight of a crosslinkable monomer having a molecular weight of not less than 280.

The acrylic polymer emulsion of the present invention more preferably contains an acrylic polymer formed by polymerizing 100% by weight in total of a monodic mixture comprising 70 to 75% by weight of an alkyl acrylate or an alkyl methacrylate, 23 to 28% by weight of a vinyl monomer of which homopolymer having a glass transition temperature Tg is not lower than 80° C., 1 to 3% by weight of a vinyl monomer having a carboxyl group and 0.5 to 2.5% by weight of a crosslinkable monomer having a molecular weight of not less than 280.

Incidentally, values of Tg in the present invention are based on data described in references such as "Polymer Handbook" issued by John Wiley & Sons Inc. or data information from monomer manufacturers.

Alkyl acrylate or alkyl methacrylate (hereinafter, it may be referred to as only a "monomer (1)") used in the present invention is a component forming a soft segment making up a main portion of polymer components of the polymer emulsion of the present invention. As such alkyl acrylate or alkyl methacrylate, there are given, for example, ethyl acrylate (Tg: −22° C.), isopropyl acrylate (Tg: −5° C.), butyl acrylate (Tg: −54° C.), 2-ethylhexyl acrylate (Tg: −85° C.), 2-ethylhexyl methacrylate (Tg: −15° C.), lauryl acrylate (Tg: −10° C.) and lauryl methacrylate (Tg: −65° C.). These compounds are used singly or in combination.

Among these acrylates, particularly for applications requiring the alcohol resistance, acrylates containing an alkyl group having carbon atoms of not less than 8 are preferable, and particularly for applications requiring the detergent resistance and the oil resistance, acrylates containing an alkyl group having carbon atoms of not more than 7 are preferable. Consequently, when the alcohol resistance as well as the detergent resistance and the oil resistance are required, it is preferred to appropriately combine the acrylates containing an alkyl group having carbon atoms of not less than 8 with the acrylates containing an alkyl group having carbon atoms of not more than 7 to use. In addition, an upper limit of number of carbon atoms of an alkyl group having carbon atoms of not less than 8 in alkyl acrylate or alkyl methacrylate is not particularly limited, but it is preferably not more than 20. When it is more than 20, there is a tendency to decease in polymerization reactivity. Among the acrylates described above, 2-ethylhexyl acrylate has a high reactivity of polymerization, and is advantageous in terms of cost and also excellent in point of characteristics of molded articles to be obtained.

An amount of the monomer (1) to be used needs to be 50 to 90% by weight with respect to 100% by weight of the acrylic polymer, preferably to be 60 to 80% by weight, and more preferably to be 70 to 75% by weight. When this amount is less than 50% by weight, the flexibility of a molded article to be obtained is insufficient, and when it is more than 90% by weight, the molded article becomes tacky and too soft, and reduces the strength of the molded article.

The vinyl monomer (hereinafter, it may be referred to as only a "monomer (2)") used in the present invention, of which homopolymer having a glass transition temperature Tg is not lower than 80° C., is one having Tg of homopolymer of the vinyl monomer of not lower than 80° C. and not having a carboxyl group. This vinyl monomer forms a hard segment of the polymer of the present invention, and as a specific example thereof, there are given acrylonitrile (Tg: 100° C.), styrene (Tg: 100° C.), and methyl methacrylate (Tg: 107° C.). These compounds are used singly or in combination. Among others, acrylonitrile or a mixed system based on acrylonitrile is excellent in point of the alcohol resistance, the oil resistance and the cost of a molded article to be obtained. By having a Tg of not lower than 80° C. or higher, it is possible to make the polymer not become too soft to prevent the reduction of the strength and the development of unnecessary tackiness. More preferably, there is used a substance having a Tg of 85 to 120° C.

An amount of the monomer (2) to be used needs to be 9 to 49% by weight with respect to 100% by weight of the acrylic polymer, preferably to be 19 to 39% by weight, and more preferably to be 23 to 28% by weight. When this amount is less than 9% by weight, the strength, the alcohol resistance, the detergent resistance and the oil resistance of a molded article to be obtained become insufficient, and when it is more than 49% by weight, the touch of the molded article becomes poor.

The vinyl monomer having a carboxyl group (hereinafter, it may be referred to as only a "monomer (3)"), used in the present invention, has an effect on the stability of a polymerization system in the case of producing the acrylic polymer of the present invention by emulsion polymerization, and together with the crosslinkable monomer, it also exerts an influence upon a crosslinking reaction in polymerizing. As a specific example, there are given acrylic acid (Tg: 106° C.), methacrylic acid (Tg: 130° C.), itaconic acid and crotonic acid. An amount thereof to be used needs to be 0.2 to 10% by weight with respect to 100% by weight of the acrylic polymer, preferably to be 0.5 to 5% by weight, and more preferably to be 1 to 3% by weight. When this amount is less than 0.2% by weight, the stability of the obtained acrylic polymer not only lowers, but also the strength of a molded article to be obtained is insufficient, and when it is more than 10% by weight, the alcohol resistance of the molded article is reduced.

The crosslinkable monomer having a molecular weight of not less than 280 (hereinafter, it may be referred to as only a "monomer (4)"), used in the present invention, is a reactive compound of relatively high molecular weight, having two or more reactive groups such as a vinyl group, an epoxy group and a glycidyl group, and a material for providing the acrylic polymer to be obtained with rubber elasticity and alcohol resistance. As a specific example of this crosslinkable monomer, there are given poly(tetramethyleneether) glycol diglycidyl ether (molecular weight: about 860), a mixture of 3-alkoxy-2-hydroxypropyl acrylate, which has alkoxy groups of 12 carbon atoms and 13 carbon atoms (molecular weight: about 330), and propylene glycol polybutylene glycol monoacrylate (molecular weight: about 562). These compounds are used singly or in combination.

Of theses compounds, poly(tetramethyleneether) glycol diglycidyl ether is available, for example, as PTMG-DEP which is a synthetic resin modifier produced by Yokkaichi Chemical Co., Ltd., and a mixture of 3-alkoxy-2-hydroxypropyl acrylate, which has alkoxy groups of 12 carbon atoms and 13 carbon atoms is available, for example, as TD-EXA which is a synthetic resin modifier produced by Yokkaichi Chemical Co., Ltd. Propylene glycol polybutylene glycol monoacrylate is available, for example, as BLEMMER 10APB-500B which is a synthetic resin modifier produced by NOF CORPORATION).

An amount of this crosslinkable monomer, namely, the monomer (4), to be used needs to be 0.1 to 5% by weight with respect to 100% by weight of the acrylic polymer, preferably to be 0.3 to 3% by weight, and more preferably to be 0.5 to 2.5% by weight. When this amount is less than 0.1% by weight, the strength of a molded article to be obtained becomes insufficient, and when it is more than 5% by weight, the touch and feeling of the molded article become poor.

When a crosslinkable monomer having a molecular weight of less than 280, for example, a crosslinkable monomer of a lower molecular weight like glycidyl methacrylate (GMA; molecular weight: 148), is used as the monomer (4), the touch and feeling or the strength of the molded article to be obtained become poor. However, this crosslinkable monomer may be used in a trace amount, namely, in an amount of not more than 0.5% by weight with respect to 100% by weight of the acrylic polymer, in combination with other monomer for the purpose of modifying or improving physical properties such as hardening a molded article a little.

In the acrylic polymer of the present invention, in addition to 100% by weight of the total of the foregoing monomers (1), (2), (3) and (4), other monomers may further be added in an amount up to about 30 parts by weight. When this amount of other monomers added is more than 30 parts by weight, this may adversely affect the physical properties of the acrylic polymer. Therefore, it is preferable to limit the amount of other monomers added up to the extent of 30 parts by weight, and more preferably up to the extent of 10 parts by weight. As a specific example of such other monomers, there are given viny compounds such as vinyl acetate, acrylamide, and 2-hydroxyethyl acrylate. These compounds are used singly or in combination. These monomers contribute to the stability of a polymer emulsion system and also exert an influence upon the crosslinking to participate in the strength of the molded articles. In addition, since these monomers are hydrophilic, the alcohol resistance is apt to deteriorate when they are used in an amount more than 30 parts by weight.

A method of polymerizing the polymer contained in the acrylic polymer emulsion of the present invention is not particularly limited. Bulk polymerization, solution polymerization, suspension polymerization and emulsion polymerization can be employed. Among others, because a polymer in emulsion form is directly produced, emulsion polymerization is advantageous. And, as a polymerization process, a batch type, a seed-batch type, an emulsion prop type or a continuous type process can be employed, but it is preferred that main monomers (1) and (2), which constitute a soft segment and a hard segment, are polymerized by a batch process from the viewpoint of keeping the balance between performance of the polymerization to be obtained and enhancing a film-forming property by increasing a molecular weight of the acrylic polymer. On the other hand, it may be preferred that the monomers (3), (4), providing functionality and crosslinkability, are added in the course of reaction.

The acrylic polymer obtained by a bulk polymerization, a solution polymerization, or suspension polymerization needs to be processed into a state of an aqueous emulsion. As an emulsifier used in bringing the acrylic polymer into emulsion or used in emulsion polymerization, an anionic surfactant and anion-nonionic surfactant can be used.

As the polymerization initiator, there can be used initiators such as a peroxide base, an azobisisobutylonitrile base, a persulfate base like APS (ammonium persulfate) and KPS (potassium persulfate) and a redox base. An amount of the initiator to be used is favorably of the level of about 0.05 to about 2 parts by weight with respect to 100% by weight of the total of the foregoing monomers (1) to (4) and other monomer described above. As for addition of the initiator, all portions may be added at the early stage, or a plurality of portions may be added separately during a polymerization reaction, or an additional portion may be added at the end of a polymerization reaction. Separate addition or addition of an additional portion at the end of polymerization is effective for reducing a polymerization time or for improving a polymerization conversion rate of the monomers. Also as for the monomers (1) to (4), all portions may be added at one operation, all portions may be added continuously, or an additional portion may be added at the intermediate stage or the end of a polymerization. As a polymerization temperature, a temperature from about 40° C. to about 85° C. is employed. By raising the polymerization temperature at the end of polymerization, it is also possible to reduce a polymerization time or to improve a polymerization conversion rate of monomers.

When a bulk polymerization, a solution polymerization, or a suspension polymerization is employed as a method of polymerization, the acrylic polymer obtained is isolated, processed in cake form or processed in slurry form and then dispersed in an aqueous solution of the above-mentioned surfactant and emulsified. When an emulsion polymerization is employed as a method of polymerization, the solution of emulsion polymerization reaction can be used in an immersion process for molding as it is.

To the acrylic polymer emulsion thus obtained, pigments such as titanium oxide, fillers such as silica, and additives such as a thickner and a pH adjusting agent may be added. In molding a glove, an aqueous solution or an alcohol solution of calcium nitrate or calcium chloride as a coagulant for an acrylic polymer is applied to the surface of a metal, ceramic or wooden mold of hand, and then the mold of hand was immersed in emulsion containing the polymer of the present invention and picked up, and the emulsion on the mold was heated and dried, and then the dried body was released from the mold of hand by reversing it to obtain a molded article of a glove. When the emulsion was heated, water content was first evaporated and then curing through crosslinking was performed.

EXAMPLES

Hereinafter, the present invention will be described more specifically by way of examples, but naturally, the scope of the present invention is not limited to these examples.

Further, evaluations of physical properties of the obtained molded articles were made according to the following methods.

Normal Tensile Strength (Strength at Break):

A specimen was cut off in the shape of JIS No. 3 dumbbell from each molded film obtained by immersion molding, and tensile strength was measured at 23° C. plus or minus 2° C. under the conditions of a chuck distance of 60 mm, a distance between marked lines of 20 mm and a tensile speed of 500 mm/min according to JIS K 6259 and 6251 using a tensile testing machine LR-5K manufactured by LLOYD. An evaluation value was determined by the following equation;

$$\text{Tensile strength (MPa)} = F_B/A,$$

wherein $F_B$ represents the tensile strength at break (N), and A represents a cross-sectional area (mm$^2$) of a specimen.

Modulus:

A tensile force at the elongation of 100% was measured under the same conditions as in normal tensile strength and modulus was determined by the following equation;

$$\text{Modulus (MPa)} = F_{100\%}/A$$

wherein $F_{100\%}$ represents a tensile force (N) at the elongation of 100%.

Elongation:

Elongation was evaluated by the longth of a specimen at the moment when the specimen was elongated to break. Prior to the test, a pair of marked lines were drawn on the specimen. The initial distance between marked lines was taken as $L_0$ (mm) and a distance between marked lines at the break was taken as $L_1$ (mm). The elongation was determined by the following equation;

Elongation (%)=$(L_1-L_0)/L_0 \times 100$

Detergent Resistance (Strength at Break):

A specimen was cut off in the shape of JIS (Japanese Industrial Standards) No. 3 dumbbell from a palm of glove by following the same procedure as in the above and immersed in an 2% aqueous solution of sodium laurylbenzene sulfonate of 55° C. plus or minus 2° C. for 22 hours plus or minus 0.5 hour and picked up, and after the sample was lightly wiped, a tensile test similar to the above was conducted and the results were evaluated.

Oil Resistance (Strength at Break):

A specimen was cut off in the shape of JIS No. 3 dumbbell by following the same procedure as in the above and immersed in white kerosene of 23° C. plus or minus 2° C. for 60 minutes plus or minus 6 minutes and picked up, and after the sample was lightly wiped, a tensile test similar to the above was conducted and the results were evaluated.

Alcohol Resistance (Strength at Break):

A specimen was cut off in the shape of JIS No. 3 dumbbell by following the same procedure as in the above and immersed in 70% ethanol of 23° C. plus or minus 2° C. for 5 minutes and picked up, and after the sample was lightly wiped, a tensile test similar to the above was conducted and the results were evaluated.

Ratio of Elongation Remaining after a Stretch:

A sample having a size of 1 cm in width and 10 cm in length was cut off from each molded film obtained by immersion molding and two marked lines of 80 mm distance were drawn. And, this sample was stretched so that the 80 mm distance between the two marked lines became 160 mm in about 2 seconds at 23° C. plus or minus 2° C. and then released from tensile and relaxed. After a lapse of 10 seconds from the relaxation, the distance (mm) between two marked lines was measured, and a ratio of elongation remaining after stretching was determined by the following equation.

Ratio of elongation remaining after stretching={(measurement of distance between marked lines−80)/80}×100(%)

Tg of Polymers:

Tg of an acrylic copolymer was calculated from Tg of a homopolymer of monomers excepting a crosslinkable monomer using Gordon—Taylor's formula.

$1/Kx=A/K1+B/K2+C/K3+$ wherein A, B and C indicate an amount of monomers respectively, K1, K2, and K3 indicate Tg of each of homopolymers, and Kx indicates Tg of the copolymers.

Film thickness: A film thickness was measured using a film thickness meter PK-1012 SU manufactured by Mitutoyo Corporation.

Example 1

Into a 3-liter reactor equipped with a condenser and a stirrer, 7.5 g of a surfactant "EMAL 2F" (sodium lauryl sulfate, produced by Kao Corporation) and 1335 ml of distilled water were charged and stirred. Further, into this, the following monodic mixture was charged, and 0.2 g of APS as a polymerization initiator and 0.2 g of $NaHSO_3$ as a reaction catalyst were charged, and polymerization was initiated at 50° C. Further, as a monomer (4), a mixture of 3-alkoxy-2-hydroxypropyl acrylate, which has alkoxy groups of 12 carbon atoms and 13 carbon atoms (TD-EXA, a resin modifier produced by Yokkaichi Chemical Co., Ltd.) was used.

Polymerization temperature was raised to 65° C. at 4 hours after the initiation of polymerization and raised to 85° C. at 7 hours after the initiation of polymerization, and then this temperature was lowered 1 hour later and an aqueous ammonia which acts as a polymerization terminator and a neutralizing agent against acrylic acid was added to terminate the polymerization.

| | |
|---|---|
| 2-EHA [monomer (1)] | 710 g |
| acrylonitrile [monomer (2)] | 260 g |
| acrylic acid [monomer (3)] | 20 g |
| TD-EXA [monomer (4)] | 10 g, |

Example 2

Polymerization was performed by following the same procedure as in Example 1 except for using 10 g of propylene glycol polybutylene glycol monoacrylate (BLEMMER 10APB-500B, a synthetic resin modifier produced by NOF CORPORATION) in place of 10 g of TD-EXA as a monomer (4).

Example 3

Polymerization was performed by following the same procedure as in Example 1 except for using 10 g of poly (tetramethyleneether) glycol diglycidyl ether (PTMG-DEP, a synthetic resin modifier produced by Yokkaichi Chemical Co., Ltd.) in place of 10 g of TD-EXA as a monomer (4).

Example 4

Polymerization was performed by following the same procedure as in Example 1 except for using 17.5 g of TD-EXA as a monomer (4) and changing an amount of 2-EHA [monomer (1)] to be blended to 702.5 g.

Example 5

Polymerization was performed by following the same procedure as in Example 1 except for using 10 g of PTMG-DEP, 5 g of TD-EXA and 5 g of 10APB-500B in place of 10 g of TD-EXA as a monomer (4) and changing an amount of 2-EHA [monomer (1)] to be blended to 700 g.

Example 6

Polymerization was performed by following the same procedure as in Example 1 except that the following monomers and the amounts thereof charged were employed in place of the monomers (1) to (4) and the amounts thereof charged in Example 1.

| | |
|---|---|
| 2-EHA [monomer (1)] | 720 g |
| acrylonitrile [monomer (2)] | 250 g |
| acrylic acid [monomer (3)] | 20 g |
| PTMG-DEP [monomer (4)] | 10 g |

Example 7

Polymerization was performed by following the same procedure as in Example 1 except that the following monomers and the amounts thereof charged were employed in place of the monomers (1) to (4) and the amounts thereof charged in Example 1.

| | |
|---|---|
| 2-EHA [monomer (1)] | 710 g |
| acrylonitrile [monomer (2)] | 250 g |
| acrylic acid [monomer (3)] | 20 g |
| PTMG-DEP [monomer (4)] | 10 g |
| TD-EXA [monomer (4)] | 5 g |
| 10APB-500B [monomer (4)] | 5 g |

Example 8

Polymerization was performed by following the same procedure as in Example 1 except that the following monomers and the amounts thereof charged were employed in place of the monomers (1) to (4) and the amounts thereof charged in Example 1.

| | |
|---|---|
| 2-EHA [monomer (1)] | 717.5 g |
| acrylonitrile [monomer (2)] | 250 g |
| acrylic acid [monomer (3)] | 20 g |
| PTMG-DEP [monomer (4)] | 7.5 g |
| TD-EXA [monomer (4)] | 5 g |

Every polymerization conversion rate of the monomers of the above Examples 1 to 8 was 95% or more.

0.12 parts by weight of potassium hydroxide as a pH adjusting agent, 0.65 parts by weight of ammonia also as a pH adjusting agent and 0.005 parts by weight of an antifoamer (SM-5512 produced by Toray Silicone Co., Ltd.) were added to 100 parts by weight of solid matter of each of the acrylic copolymer emulsions obtained to prepare the emulsion.

Then, a coagulant for each of the prepared emulsion, comprising 100 parts by weight of methanol, 25 parts by weight of potassium nitrate, 10 parts by weight of calcium carbonate and 0.05 parts by weight of a wetting agent (EMULGEN 1135s-70 produced by Kao Corporation), was applied to a ceramic mold of hand, and then this mold of hand was immersed in each of prepared emulsions. Then, the immersed mold of hand was picked up and dried at 75° C. for 3 minutes to mold, and leaching was performed for 1 minute with water or hot water, and then dried at 75° C. and heated at 140° C. for crosslinking. Then, a molded article was released from the mold of hand by reversing the molded article to obtain a glove. A sample was cut off from a flat portion of the obtained glove and physical properties were measured. The results are shown in Table 1.

Comparative Example 1

A similar sample was cut off from a commercially available acrylic glove (manufactured by Chiyodakasei) molded by using an acrylic resin to which a plasticizer was added and subjected to evaluations of physical properties. The results are shown in Table 1.

Comparative Example 2

Polymerization was performed by following the same procedure as in Example 1 except that the following monomers and the amounts thereof charged were employed in place of the monomers (1) to (4) and the amounts thereof charged in Example 1.

| | |
|---|---|
| n-butyl acrylate [monomer (1)] | 830 g |
| acrylonitrile [monomer (2)] | 150 g |
| acrylic acid [monomer (3)] | 20 g |

Comparative Example 3

Polymerization was performed by following the same procedure as in Example 1 except that the following monomers and the amounts thereof charged were employed in place of the monomers (1) to (4) and the amounts thereof charged in Example 1, namely, glycidyl methacrylate (GMA, molecular weight 148) was used in the crosslinking agent.

| | |
|---|---|
| 2-EHA [monomer (1)] | 710 g |
| acrylonitrile [monomer (2)] | 260 g |
| acrylic acid [monomer (3)] | 20 g |
| GMA | 10 g |

Comparative Example 4

Polymerization was performed by following the same procedure as in Example 1 except that the following monomers and the amounts thereof charged were employed in place of the monomers (1) to (4) and the amounts thereof charged in Example 1, namely, the monomer (4) was not used.

| | |
|---|---|
| 2-EHA [monomer (1)] | 720 g |
| acrylonitrile [monomer (2)] | 260 g |
| acrylic acid [monomer (3)] | 20 g |

Comparative Example 5

Polymerization was performed by following the same procedure as in Example 1 except that the following monomers and the amounts thereof charged were employed in place of the monomers (1) to (4) and the amounts thereof charged in Example 1, namely, diethylene glycol dimethacrylate (PDE-100 produced by NOF CORPORATION, molecular weight about 260) was used as the crosslinking agent.

| | |
|---|---|
| 2-EHA [monomer (1)] | 710 g |
| acrylonitrile [monomer (2)] | 260 g |
| acrylic acid [monomer (3)] | 20 g |
| PDE-100 | 10 g |

With respect to Comparative Examples 2 to 5, gloves were prepared by following the same procedure as in Examples 1 to 8 and subjected to evaluations of physical properties. The results are shown in detergent resistance and the oil resistance are not less than 6.5 MPa respectively it is assumed to be good, and when the ratio of elongation remaining after stretching is not more than 10%, it is assumed to be good.

These values were established making reference to JAS (Japanese Agricultural Standards) of an NBR glove or evaluation values of extremely thin gloves such as NBR, NR, PVC, etc.

Overall evaluations were carried out according to the following criteria.

⊚: Number of items which do not satisfy the above criteria "to be good" is one or less and the alienation

TABLE 1

| Ex. Comp. Ex. | Composition of monomers | | | | Composition of crosslinkable monomers | | | | | Tg (° C.) | Thickness of film (mm) |
|---|---|---|---|---|---|---|---|---|---|---|---|
| | (1) BA | (1) 2EHA | (2) AN | (3) AA | (4) PTMG-DEP | (4) TD-EXA | (4) 10APB-500B | PDE-100 | GMA | | |
| Ex. 1 | | 71 | 26 | 2 | | 1 | | | | −52 | 0.09 |
| Ex. 2 | | 71 | 26 | 2 | | | 1 | | | −52 | 0.14 |
| Ex. 3 | | 71 | 26 | 2 | 1 | | | | | −52 | 0.14 |
| Ex. 4 | | 70.25 | 26 | 2 | | 1.75 | | | | −50 | 0.14 |
| Ex. 5 | | 70 | 26 | 2 | 1 | 0.5 | 0.5 | | | −49 | 0.12 |
| Ex. 6 | | 72 | 25 | 2 | 1 | | | | | −53 | 0.13 |
| Ex. 7 | | 71 | 25 | 2 | 1 | 0.5 | 0.5 | | | −50 | 0.12 |
| Ex. 8 | | 71.75 | 25 | 2 | 0.75 | 0.5 | | | | −52 | 0.13 |
| Comp. Ex. 1 | Commercialized acryl (containing a plasticizer) | | | | | | | | | | 0.3 |
| Comp. Ex. 2 | 83 | | 15 | 2 | | | | | | −38 | 0.11 |
| Comp. Ex. 3 | | 71 | 26 | 2 | | | | 1 | | −52 | 0.13 |
| Comp. Ex. 4 | | 72 | 26 | 2 | | | | | | −54 | 0.12 |
| Comp. Ex. 5 | | 71 | 26 | 2 | | | | | 1 | −52 | 0.14 |

| Ex. Comp. Ex. | Performance | | | | | | | Overall evaluation |
|---|---|---|---|---|---|---|---|---|
| | Normal tensile strength | | | Alcohol resistance | Detergent resistance | Oil resistance | Ratio of elongation remaining after a stretch | |
| | Tensile strength (MPa) | Modulus (MPa) | Elongation (%) | Tensile strength (MPa) | Tensile strength (MPa) | Tensile strength (MPa) | | |
| Criteria | 14≦ | ≦2.5 | 500≦ | 6.5≦ | 6.5≦ | 6.5≦ | ≦10 | |
| Ex. 1 | 14.6 | 1.1 | 585 | 7.4 | 4.7 | 3.3 | 9 | ○ |
| Ex. 2 | 14.8 | 2.5 | 509 | 6.5 | 5.7 | 4.0 | 14 | Δ |
| Ex. 3 | 16.5 | 1.6 | 543 | 8.0 | 7.9 | 5.8 | 9.0 | ⊚ |
| Ex. 4 | 18.1 | 1.6 | 547 | 7.4 | 6.6 | 6.4 | 13 | ○ |
| Ex. 5 | 20.6 | 2.2 | 525 | 10.0 | 8.5 | 8.0 | 13 | ⊚ |
| Ex. 6 | 17.5 | 1.4 | 541 | 7.6 | 5.8 | 6.7 | 8 | ⊚ |
| Ex. 7 | 18.9 | 1.9 | 512 | 7.2 | 6.8 | 6.3 | 9 | ⊚ |
| Ex. 8 | 19.1 | 1.4 | 589 | 7.6 | 7.3 | 6.5 | 8 | ⊚ |
| Comp. Ex. 1 | 7.6 | 1.2 | 357 | 2.0 | 4.6 | 7.6 | 10 | X |
| Comp. Ex. 2 | 12.6 | 0.5 | 599 | 2.3 | 1.7 | 8.9 | 4 | X |
| Comp. Ex. 3 | 21.9 | 4.2 | 391 | 2.5 | 8.3 | 5.8 | 33 | X |
| Comp. Ex. 4 | 17.2 | 2.9 | 533 | 7.3 | 6.4 | 5.4 | 20 | X |
| Comp. Ex. 5 | 6.7 | 2 | 740 | 3.3 | 1.4 | 1.5 | 3 | X |

BA: butyl acrylate
2EHA: 2-ethylhexyl acrylate
AN: acrylonitrile
AA: acrylic acid
PTMG-DEP: poly (tetramethylene ether) glycol diglicidyl ether
TD-EXA: 3-alkoxy-2-hydroxypropyl acrylate
10APB-500B: propylene glycol polybutylene glycol monoacrylate
PDE-100: diethylene glycol dimethacrylate
GMA: glycidyl methacrylate In the above physical properties, when the tensile strength is not less than 14 MPa, it is assumed to be good, and when the modulus is not more than 2.5 MPa, it is assumed to be good, and when the elongation is not less than 500%, it is assumed to be good, and when the alcohol resistance, the detergent resistance and the oil resistance are not less than 6.5 MPa respectively it is assumed to be good, and when the ratio of elongation remaining after stretching is not more than 10%, it is assumed to be good.

from the standard is small, and as a whole, it has the good balance between a good mechanical performance, alcohol resistance, detergent resistance, oil resistance and a ratio of elongation remaining after stretching and it is rated as comprehensively very good.

○: Number of items which do not satisfy the above criteria "to be good" is two or less and the alienation from the standard is relatively small, and it is rated as comprehensively good.

Δ: Number of items which do not satisfy the above criteria "to be good" is three or more and the alienation from the standard is relatively small, and it is rated as comprehensively slightly bad.

x: Number of items which do not satisfy the above criteria "to be good" is three or more and the alienation from the standard is large, and it is rated as comprehensively bad.

In Examples 1 and 4, each amount of TD-EXA (3-alkoxy (C12&C13)-2-hydroxypropyl acrylate) added singly as a monomer (4) was changed. When the amount of TD-EXA added is increased (Example 4), the tensile strength increases but the recovering property (the ratio of elongation remaining after a stretch) is somewhat deteriorated, and when the amount of TD-EXA added is decreased (Example 1), the recovering property is good but the tensile strength is slightly reduced. In either case, in the case of using TD-EXA, an effect of adding TD-EXA was recognized compared with the case of not using TD-EXA like Comparative Example 4, and effects on the tensile strength, modulus and recovering property were recognized, and therefore it could be confirmed that even when the tensile strength becomes high, the polymer has low modulus and flexibility and the recovering property was also improved, and therefore the polymer becomes like rubber more.

The result of Example 2 shows an effect in using 10APB-500B (propylene glycol polybutylene glycol monoacrylate) singly as a monomer (4), an improvement in the recovering property was recognized compared with the case of not using 10APB-500B like Comparative Example 4. Since other physical properties were moderate, it was favorable to use this in combination with other crosslinkable monomers as described later (Example 5, Example 7).

The result of Example 3 shows an effect in using PTMG-DEP (poly(tetramethyleneether) glycol diglycidyl ether) singly as a monomer (4). The obtained polymer had a good balance throughout the whole, and was found to have a considerable effect, and had an excellent recovering property and flexibility, and therefore PTMG-DEP exhibited an excellent effect singly.

In Example 5, TD-EXA, 10APB-500B and PTMG-DEP are used in combination as the monomer (4), and a further improvement was found.

In Example 6, the amount of AN (acrylonitrile) was reduced by 1% by weight from that in Example 3, an effect almost similar to that of Example 3 was obtained. Further, the recovering property was further slightly improved.

Examples 7 and 8 were similar and were formed by combining two or three kinds of the monomers (4) and it was found that flexible polymers like rubber having a good balance throughout the whole were obtained. Particularly, the polymer of Example 8 was the best one among these examples from the viewpoint of the whole balance.

In Comparative Example 1, a commercially available acrylic resin glove formed by adding a plasticizer to an acrylic resin was purchased and subjected to evaluations, but they were poor in all of strength, elongation and alcohol resistance.

In Comparative Example 2, the emulsion, formed by using butyl acrylate(BA) containing an alkyl group having carbon atoms of not more than 7 in place of the monomer (1), was evaluated and this polymer had the flexibility but lacked the strength, the alcohol resistance and the detergent resistance, because of no use of the crosslinkable monomer.

In Comparative Example 3, since GMA (glycidyl methacrylate, molecular weight 148), which was a short chain glycidyl group, was used as the crosslinkable monomer, the obtained polymer had a high modulus, a small elongation, poor alcohol resistance and an extremely poor recovering property, and thereby the polymer became like a resin. That is, in the crosslinkable monomer having a molecular weight of not more than 280, strength could be developed, but touch and physical properties were poor.

In Comparative Example 4, since the crosslinkable monomer was not used, the obtained polymer had a poor recovering property and did not become like rubber.

In Comparative Example 5, since PDE-100 (diethylene glycol dimethacrylate) was used as a crosslinkable monomer, the crosslinkable monomer had a molecular weight of not more than 280 as with Comparative Example 3, and therefore the obtained polymer had an effect on the elongation and the recovering property but it was extremely inferior in strength, alcohol resistance, detergent resistance and oil resistance.

Example 9

Polymerization was performed by following the same procedure as in Example 1 except that the following monomers and the amounts thereof charged were employed in place of the monomers (1) to (4) and the amounts thereof charged in Example 1.

| | |
|---|---|
| BA [monomer (1)] | 667.5 g |
| acrylonitrile [monomer (2)] | 300 g |
| acrylic acid [monomer (3)] | 20 g |
| PTMG-DEP [monomer (4)] | 7.5 g |
| TD-EXA [monomer (4)] | 5 g |

Example 10

Polymerization was performed by following the same procedure as in Example 1 except that the following monomers and the amounts thereof charged were employed in place of the monomers (1) to (4) and the amounts thereof charged in Example 1.

| | |
|---|---|
| BA [monomer (1)] | 677.5 g |
| acrylonitrile [monomer (2)] | 290 g |
| acrylic acid [monomer (3)] | 20 g |
| PTMG-DEP [monomer (4)] | 7.5 g |
| TD-EXA [monomer (4)] | 5 g |

Example 11

Polymerization was performed by following the same procedure as in Example 1 except that the following monomers and the amounts thereof charged were employed in place of the monomers (1) to (4) and the amounts thereof charged in Example 1.

| BA [monomer (1)] | 150 g |
|---|---|
| 2-EHA [monomer (1)] | 527.5 g |
| acrylonitrile [monomer (2)] | 280 g |
| acrylic acid [monomer (3)] | 20 g |
| PTMG-DEP [monomer (4)] | 15 g |
| TD-EXA [monomer (4)] | 7.5 g |

Example 12

Polymerization was performed by following the same procedure as in Example 1 except that the following monomers and the amounts thereof charged were employed in place of the monomers (1) to (4) and the amounts thereof charged in Example 1.

| BA [monomer (1)] | 717.5 g |
|---|---|
| acrylonitrile [monomer (2)] | 250 g |
| acrylic acid [monomer (3)] | 20 g |
| PTMG-DEP [monomer (4)] | 7.5 g |
| TD-EXA [monomer (4)] | 5 g |

Example 13

Polymerization was performed by following the same procedure as in Example 1 except that the following monomers and the amounts thereof charged were employed in place of the monomers (1) to (4) and the amounts thereof charged in Example 1.

| BA [monomer (1)] | 300 g |
|---|---|
| 2-EHA [monomer (1)] | 417.5 g |
| acrylonitrile [monomer (2)] | 250 g |
| acrylic acid [monomer (3)] | 20 g |
| PTMG-DEP [monomer (4)] | 7.5 g |
| TD-EXA [monomer (4)] | 5 g |

Example 14

Polymerization was performed by following the same procedure as in Example 1 except that the following monomers and the amounts thereof charged were employed in place of the monomers (1) to (4) and the amounts thereof charged in Example 1.

| 2-EHA [monomer (1)] | 707.5 g |
|---|---|
| acrylonitrile [monomer (2)] | 250 g |
| acrylic acid [monomer (3)] | 20 g |
| PTMG-DEP [monomer (4)] | 15 g |
| TD-EXA [monomer (4)] | 7.5 g |

With respect to Examples 9 to 14, gloves were prepared by following the same procedure as in Examples 1 to 8 and subjected to evaluations of characteristics. The results are shown in Table 2.

TABLE 2

| | Composition of monomers | | | | Composition of cross-linkable monomers | | | Thickness of film (mm) | Performance Normal tensile strength | | |
|---|---|---|---|---|---|---|---|---|---|---|---|
| | (1) | (1) | (2) | (3) | (4) | (4) | Tg | | Tensile strength (MPa) | Modulus (MPa) | Elongation (%) |
| Ex. | BA | 2EHA | AN | AA | PTMG-DEP | TD-EXA | (° C.) | | Criteria | | |
| | | | | | | | | | 14≦ | ≦2.5 | 500≦ |
| Ex. 9 | 66.75 | 0 | 30 | 2 | 0.75 | 0.5 | | 38.7 | 38.7 | 5.6 | 413 |
| Ex. 10 | 67.75 | 0 | 29 | 2 | 0.75 | 0.5 | −18 | 0.14 | 24.4 | 2.1 | 436 |
| Ex. 11 | 15 | 52.75 | 28 | 2 | 1.5 | 0.75 | −40 | 0.16 | 17.2 | 2.0 | 503 |
| Ex. 12 | 71.75 | 0 | 25 | 2 | 0.75 | 0.5 | −23 | 0.13 | 26.6 | 1.4 | 465 |
| Ex. 13 | 30 | 41.75 | 25 | 2 | 0.75 | 0.5 | −41 | 0.145 | 24.7 | 1.4 | 548 |
| Ex. 14 | 0 | 70.75 | 25 | 2 | 1.5 | 0.75 | −50 | 0.15 | 22.2 | 2.4 | 577 |

| | Performance | | | | |
|---|---|---|---|---|---|
| | Alcohol resistance Tensile strength (MPa) | Detergent resistance Tensile strength (MPa) | Oil resistance Tensile strength (MPa) | Ratio of elongation remaining after a stretch | |
| Ex. | Criteria | | | | Overall evaluation |
| | 6.5≦ | 6.5≦ | 6.5≦ | ≦10 | |
| Ex. 9 | 8.2 | 15.9 | 26.4 | 18 | Δ |
| Ex. 10 | 2.4 | 7.9 | 8.0 | 5 | ○ |
| Ex. 11 | 8 | 8.5 | 6.9 | 9 | ◉ |
| Ex. 12 | 2.1 | 8.3 | 7.1 | 2 | ○ |

TABLE 2-continued

| | | | | | |
|---|---|---|---|---|---|
| Ex. 13 | 2.9 | 7.4 | 9.2 | 4 | ⊚ |
| Ex. 14 | 7.6 | 7.8 | 6.5 | 7 | ◎ |

BA: butyl acrylate
2EHA: 2-ethylhexyl acrylate
AN: acrylonitrile
AA: acrylic acid
PTMG-DEP: poly (tetramethylene ether) glycol diglicidyl ether
TD-EXA: 3-alkoxy-2-hydroxypropyl acrylate As is evident from Table 2, it is found that particularly, the detergent resistance and the oil resistance are improved and the returning property is remarkably improved by using alkyl acrylate containing an alkyl group having carbon atoms of not more than 7 singly or by appropriately using alkyl acrylate containing an alkyl group having carbon atoms of not more than 7 and alkyl acrylate containing an alkyl group having carbon atoms of not less than 8 in combination.

INDUSTRIAL APPLICABILITY

As described above, the acrylic polymer emulsion of the present invention results in improved detergent resistance and oil resistance by introducing a crosslinkable monomer having a relatively large molecular weight into an alkyl acrylate monomer, and further results in remarkably improved alcohol resistance by introducing the above crosslinkable monomer into a long chain alkyl acrylate monomer. And, by using the above crosslinkable monomer having plasticity and flexibility, the acrylic polymer emulsion of the present invention results in improved balance of practical performance and also has the flexibility and the recovering property after a stretch like rubber as distinct from a paper-like resin touch, and can provides an practically usable acrylic glove, an acrylic emulsion material for molding this glove and a glove molded using this material.

The invention claimed is:

1. An acrylic polymer emulsion containing a polymer formed by polymerizing 100% by weight in total of a monomeric mixture comprising 50 to 90% by weight of an alkyl acrylate or an alkyl methacrylate, 9 to 49% by weight of a vinyl monomer of which homopolymer having a glass transition temperature Tg is not lower than 80° C., 0.2 to 10% by weight of a vinyl monomer having a carboxyl group and 0.1 to 5% by weight of a crosslinkable monomer which is poly(tetramethyleneether)glycol diglycidyl ether having a molecular weight of not less than 280.

2. An acrylic polymer emulsion containing a polymer formed by polymerizing 100% by weight in total of a monomeric mixture comprising 60 to 80% by weight of an alkyl acrylate or an alkyl methacrylate, 19 to 39% by weight of a vinyl monomer of which homopolymer having a glass transition temperature Tg is not lower than 80° C., 0.5 to 5% by weight of a vinyl monomer having a carboxyl group and 0.3 to 3% by weight of a crosslinkable monomer which is poly(tetramethyleneether)glycol diglycidyl ether having a molecular weight of not less than 280.

3. An acrylic polymer emulsion containing a polymer formed by polymerizing 100% by weight in total of a monomeric mixture comprising 70 to 75% by weight of an alkyl acrylate or an alkyl methacrylate, 23 to 28% by weight of a vinyl monomer of which homopolymer having a glass transition temperature Tg is not lower than 80° C., 1 to 3% by weight of a vinyl monomer having a carboxyl group and 0.5 to 2.5% by weight of a crosslinkable monomer which is poly(tetramethyleneether)glycol diglycidyl ether having a molecular weight of not less than 280.

4. The acrylic polymer emulsion according to any one of claims 1 to 3, wherein the alkyl acrylate or the alkyl methacrylate is an alkyl acrylate or an alkyl methacrylate containing an alkyl group having carbon atoms of not less than 8.

5. The acrylic polymer emulsion according to claim 4, wherein the alkyl acrylate or the alkyl methacrylate containing an alkyl group having carbon atoms of not less than 8 is at least one kind selected from 2-ethylhexyl acrylate, 2-ethylhexyl methacrylate, lauryl acrylate and lauryl methacrylate.

6. The acrylic polymer emulsion according to any one of claims 1 to 3, wherein the vinyl monomer of which homopolymer having a glass transition temperature Tg is not lower than 80° C. is at least one kind selected from acrylonitrile, styrene and methyl methacrylate.

7. The acrylic polymer emulsion according to any one of claims 1 to 3, wherein the vinyl monomer having a carboxyl group is acrylic acid.

8. The acrylic polymer emulsion according to any one of claims 1 to 3, further comprising at least one crosslinkable monomer selected from the group consisting of propylene glycol polybutylene glycol monoacrylate and 3-alkoxy-2-hydroxypropyl acrylate having an alkoxy group with carbon atoms of not less than 10.

9. A glove obtained by molding by a method of immersing a mold of hand using the acrylic polymer emulsion defined by any one of claims 1 to 3.

* * * * *